United States Patent [19]

Harper

[11] 3,954,232

[45] May 4, 1976

[54] KNEELABLE AIRCRAFT LANDING GEAR

[75] Inventor: Philip M. Harper, Bellevue, Wash.

[73] Assignee: The Boeing Company, Seattle, Wash.

[22] Filed: Nov. 11, 1974

[21] Appl. No.: 522,503

[52] U.S. Cl. .......................................... 244/102 R
[51] Int. Cl.² ............................................ B64C 25/66
[58] Field of Search ....... 244/100 R, 102 R, 102 SS, 244/104 R, 104 FP, 108, 50, 17.17, 118 R; 280/9, 10, 11, 43.14, 43.24; 188/5

[56] References Cited
UNITED STATES PATENTS

| | | | |
|---|---|---|---|
| 2,340,558 | 2/1944 | Porter | 280/9 |
| 2,348,493 | 5/1944 | Parker | 244/104 FP |
| 2,652,214 | 9/1953 | Cussons | 244/50 |
| 2,779,556 | 1/1957 | Hogan | 244/50 |
| 2,838,944 | 6/1958 | Kendall | 244/50 UX |
| 2,927,747 | 3/1960 | Bennie | 244/17.17 |
| 2,977,073 | 3/1961 | Ditter et al. | 244/108 |
| 3,010,682 | 11/1961 | Moss et al. | 244/108 |
| 3,027,122 | 3/1962 | Westcott | 244/50 X |
| 3,323,761 | 6/1967 | Copeland | 244/102 R |
| 3,335,981 | 8/1967 | Pauli et al. | 244/102 R |

FOREIGN PATENTS OR APPLICATIONS

| | | | |
|---|---|---|---|
| 435,846 | 3/1948 | Italy | 244/104 R |
| 954,087 | 12/1949 | France | 244/102 SS |

OTHER PUBLICATIONS

A.P.C. Application of Mercier, Serial No. 314406, Published May 1943.

*Primary Examiner*—Trygve M. Blix
*Assistant Examiner*—Galen L. Barefoot
*Attorney, Agent, or Firm*—Christensen, O'Connor, Garrison & Havelka

[57] ABSTRACT

Disclosed is a steerable, articulated landing gear particularly useful on cargo aircraft and providing a capability to selectively raise and lower the aircraft fuselage, and hence the cargo deck, to a height convenient for loading and unloading of cargo therefrom. The gear includes a shock strut, and a wheel lever on one end of which are mounted two wheels. The wheel lever is pivotably connected to the lower end of the strut at an articulation point remote from the rotational axes of the truck wheels. An extendable-retractable shock absorber mounted within the strut is connected to the lever at a point between the strut-lever articulation and the rotational axes of the wheels. Retraction of the shock absorber lowers the strut-lever articulation relative to the axes of the wheels. A ground-engaging member or "kneeler" depending downwardly from the lower end of the strut at the strut-lever articulation defines a flat, horizontally orientable, ground engaging surface. When the truck wheels are contacting the ground, lowering the strut-lever articulation causes the flat surface on the kneeler to engage the ground and the kneeler to assume at least part of the load borne by the gear. In one embodiment, the strut is extendable and retractable independently of the shock absorber and in another the effective height of the kneeler is adjustable.

12 Claims, 11 Drawing Figures

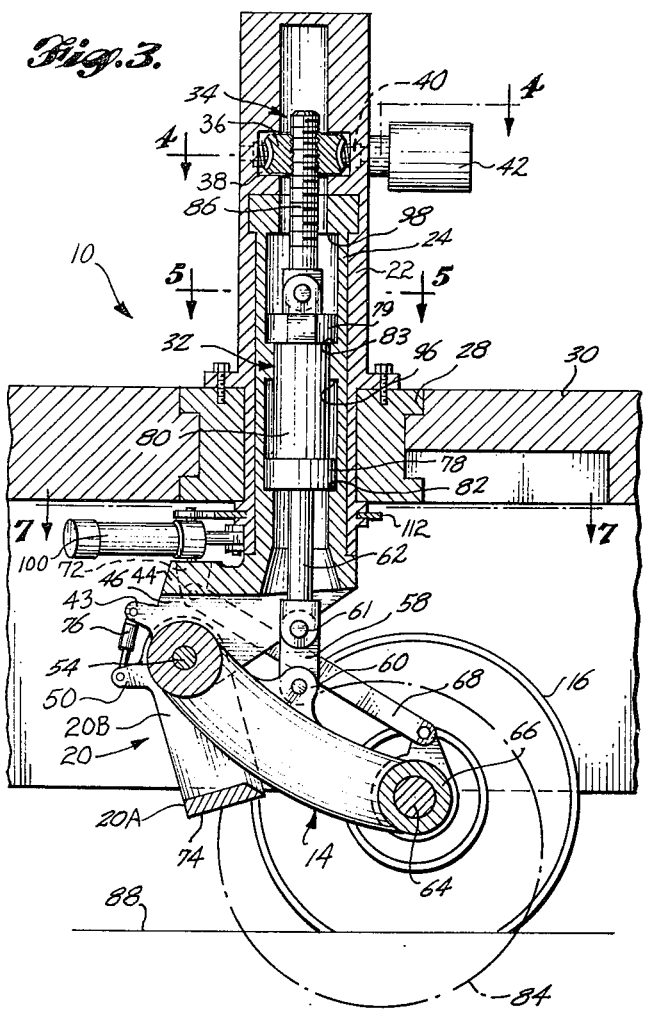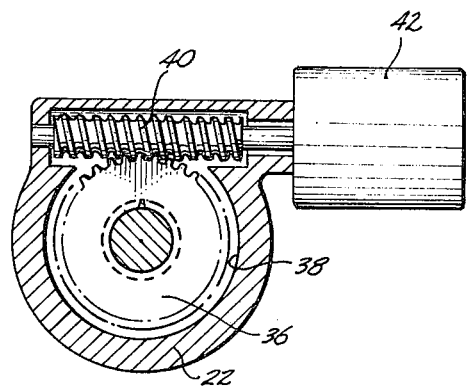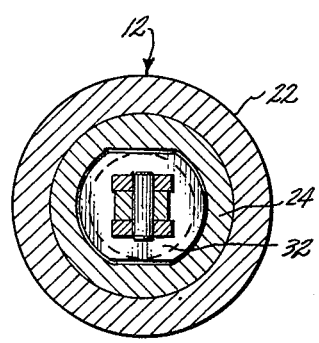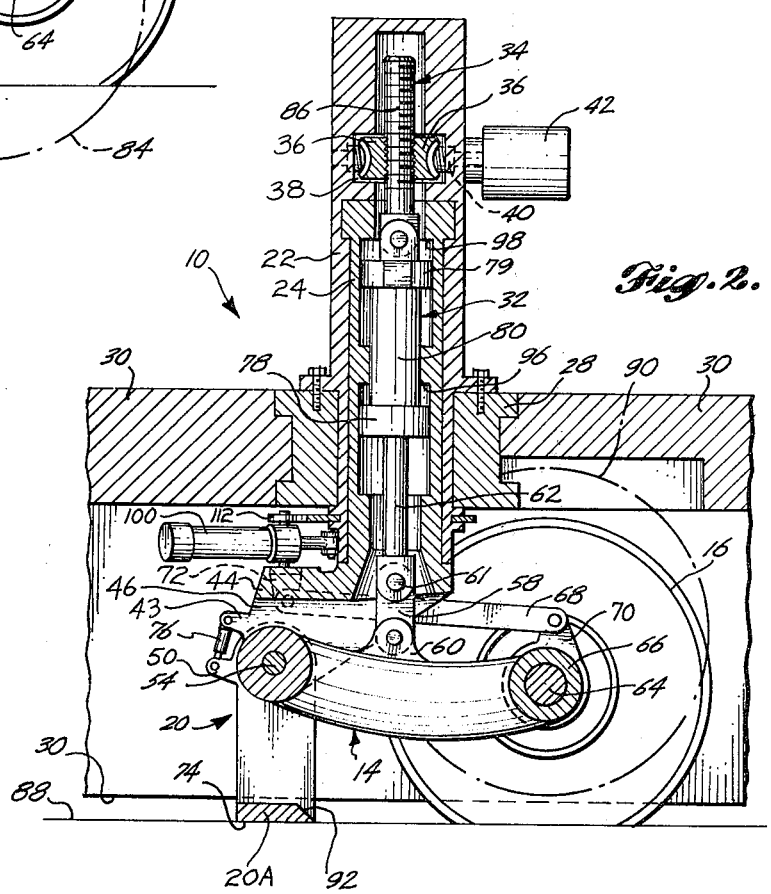

KNEELABLE AIRCRAFT LANDING GEAR

BACKGROUND OF THE INVENTION

This invention relates to aircraft landing gear and particularly to extendable-retractable landing gear useful on cargo aircraft and providing a capability to selectively raise and lower the fuselage of the aircraft during ground operations.

There is a need for aircraft landing gear for cargo aircraft that will provide the capability to raise and lower a parked aircraft so as to position its cargo deck at a height convenient for cargo loading and unloading; and provide rigid, unsprung support for an aircraft during loading and unloading; and yet also provide adequate ground clearance and impact-absorbing support during landing and taxiing. It is an object of this invention to provide aircraft landing gear satisfying the just-mentioned need. It is a further object of the preferred embodiments of this invention to satisfy this need and also provide a landing gear that is steerable, has a structural load path common to all modes of operation, and is fully retractable during flight. Other objects of this invention will become apparent from the following detailed specification, the accompanying drawings and the appended claims.

SUMMARY OF THE INVENTION

In summary, this invention is directed to an articulated aircraft landing gear assembly comprising a shock strut comprising a rigid, tubular housing and shock absorbing means (which is preferably a liquid spring shock absorber) mounted in said housing for absorbing shock applied to the assembly. A wheel lever having first and second ends is pivotably connected to the strut housing near the first end such that the lever is pivotable in a vertical plane about its first end between an extended position and a retracted position. A wheel is mounted on the lever near its second end. The lever is operatively connected to the shock absorbing means between its first and second ends. The assembly further comprises power means for selectively varying the effective length of the shock absorbing means to thereby move the lever between its extended and retracted positions to raise and lower the wheel and thereby vary the effective height of the landing gear assembly. A rigid aircraft support means (sometimes referred to hereinafter as a "kneeler") for supporting at least a portion of the load borne by the landing gear assembly is mounted on the strut housing near the first end of the lever. The kneeler defines a flat, ground engaging surface on its underside and extends downwardly from the strut housing a distance such that when the wheel is in contact with the ground and the wheel lever is moved from its extended position toward its retracted position, the flat surface of the support means contacts the ground and at least a portion of the load borne by the landing gear assembly is transferred from the wheel to the kneeler.

Preferably, the kneeler is pivotable in a vertical plane about an axis coincident with the pivot axis of the lever and the landing gear assembly includes actuator means for effecting pivoting of the kneeler. The kneeler preferably comprises a pivotable U-shaped member including a horizontal cross-bar defining the ground engaging surface and two spaced apart arms extending upwardly from the cross-bar, the pivot axis extending through the upper ends of the arms. The kneeler is preferably so constructed that its effective height can be selectively varied. A preferred, variable height kneeler comprises a U-shaped member as described previously, an upper cam member and a lower cam member immediately subjacent the upper cam member. Each cam member has a flat cam surface abutting against the cam surface of the other. A first connection means, such as a pin, connects the upper cam member to the strut housing so as to permit rotation of the upper cam member in a vertical plane about a first rotation axis. A second connection means, such as a pin, connects the lower cam member to one of the arms of the U-shaped member so as to permit rotation of the lower cam member in a vertical plane about a second rotation axis. The kneeler also includes power means connected to the cam members for effecting counterrotation of the cam members about their respective rotation axes to thereby cause the cam surfaces to slide along one another. The cam surfaces are so oriented relative to a line between the rotation axes of the cam members that counterrotation of the cam members causes the distance between the rotation axes and the effective height of the kneeler to vary. Preferably, the arm to which the lower cam member is connected defines near its upper end a vertically elongated slot and the first connection means comprises a horizontally disposed pin extending through the slot and the upper cam member.

In the preferred embodiment of the landing gear assembly of this invention the strut housing comprises tubular, coaxial, inner and outer housings, the inner housing being contained in and supported by the outer housing and being axially rotatable relative thereto. In this preferred embodiment, the shock absorbing means is contained in the inner housing and a means, such as a jack-screw, is provided for varying the effective length of the shock absorbing means by selectively moving same along the inner housing.

In the landing gear assemblies of this invention, actuator means for effecting rotation of the inner housing relative to the outer housing can be provided so that the assembly is steerable. To achieve the capability to vary the height of the assembly through a larger range than is possible by varying only the effective length of shock absorbing means the inner housing can be moveable axially along the outer housing and the assembly can be provided with power means for effecting such movement of said inner housing.

BRIEF DESCRIPTION OF THE DRAWINGS

FIG. 2 is a vertical sectional view of the landing gear of FIG. 1.

FIG. 3 is similar to FIG. 2, but shows the landing gear in its extended position for takeoff, landing and taxiing.

FIGS. 4 and 5 are horizontal sectional views taken along lines 4—4 and 5—5 of FIG. 3.

DETAILED DESCRIPTION OF THE INVENTION AND THE PREFERRED EMBODIMENTS

Figure 1:
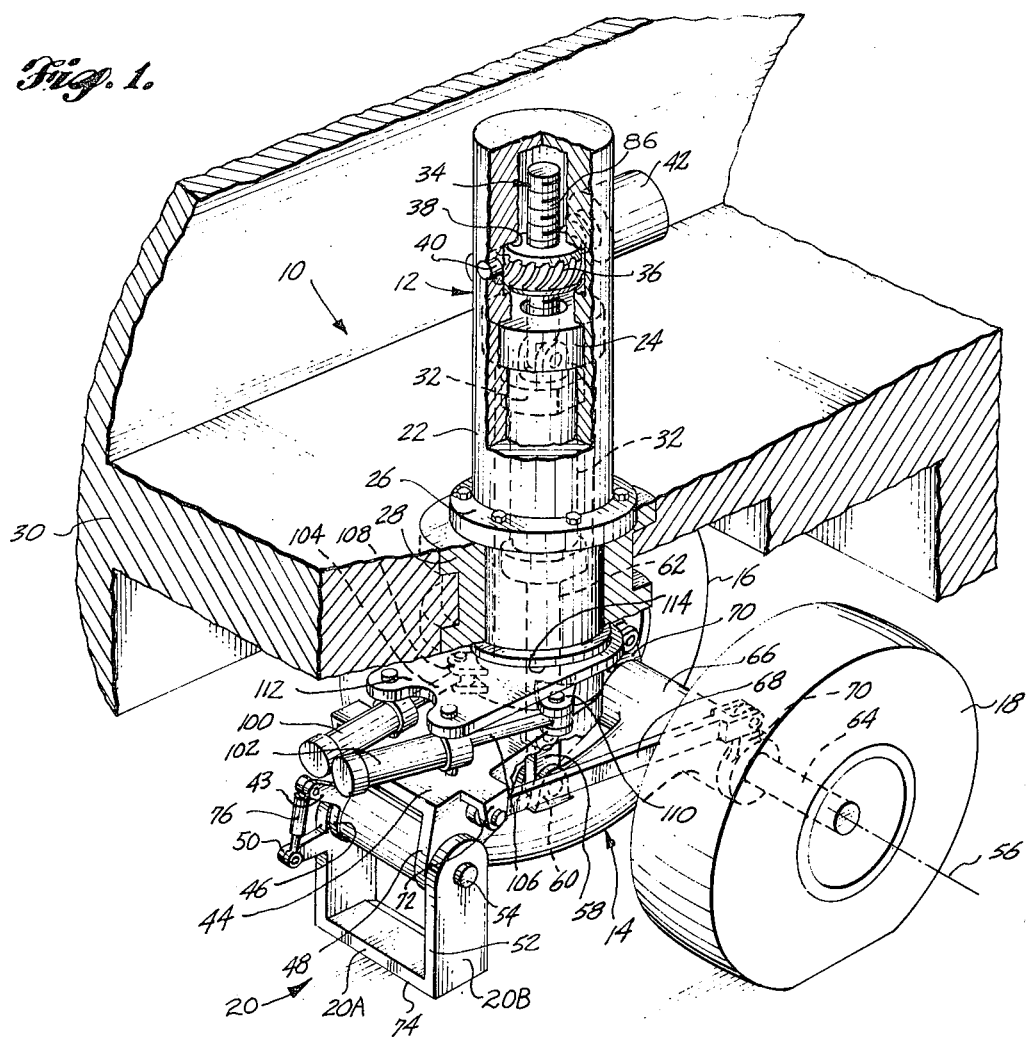
FIG. 1 is an isometric view of a kneelable landing gear according to the present invention in its kneeling position; parts are broken away for clarity.

Referring in particular to FIGS. 1–3, there is shown one embodiment of the landing gear assembly of this invention. The gear 10 is comprised of three major subassemblies, viz., a shock strut 12, a wheel lever 14 and associated wheels 16 and 18, and an aircraft support member 20 hereinafter often referred to as a "kneeler." The shock strut 12 is comprised of a tubular outer housing 22 and a tubular inner housing 24 contained therewithin and supported thereby. A mounting ring 26 provided on the outer housing is bolted to a mounting sleeve 28 in the aircraft fuselage 30. The outer housing is thus fixed against rotation and translation relative to the fuselage. The outer housing supports the remainder of the gear during flight and provides the load path for all loads borne by the gear.

The inner housing 24 is rotatable relative to the outer housing 22 and is provided with power means discussed in more detail hereinafter by which it can be rotated around its longitudinal axis through a limited range to thereby provide steering capability to the landing gear. The inner housing contains a shock absorber 32 which preferably is a liquid spring (or "compressed oil") shock absorber. As shown most clearly in FIG. 5, the cross-sections of the interior of the inner housing 24 and the upper end of the shock absorber cylinder 32 are such that rotation of the shock absorber relative to the inner housing is prevented.

The upper end of the shock absorber 32 is connected to the screw 86 of a conventional jack-screw assembly 34 (which is preferably of the low-friction, ball screw type). The nut 36 of the jack-screw is contained within a cavity 38 in the upper portion of the outer housing 22 and is rotatable within the cavity but otherwise restrained from movement. As best shown in FIG. 4, the nut is driven by a single start worm gear 40 which is in turn driven by a hydraulic or electric drive motor 42.

The lower end of the inner housing 24 which protrudes beyond the fuselage 30 and the lower end of the outer housing 22 is formed or otherwise provided with a forwardly extending plate 44 from which spaced apart flanges 46 and 48 extend downwardly. The forward end of the wheel lever 14 is disposed between these two flanges 46 and 48 and the arms 50 and 52 of the U-shaped kneeler 20 are disposed on the outside of the flanges. Both the wheel lever and the kneeler are pivotably connected to the flanges 46 and 48 by means of a pin 54. The lever and kneeler are pivotable independently in a vertical plane about the axis of the pin. The pivotal interface between the lever and the inner housing is the articulation point of the landing gear.

The wheel lever is connected to the lower end of the shock absorber 32 at a location near the midpoint between the articulation point at pin 54 and the rotational axis 56 of the wheels 16 and 18. Connection between the wheel lever and the shock absorber is through a connecting link 58 that is pinned in clevis 60 on the beam and clevis 61 on the lower end of the shock absorber. This link 58 is pivotable about both pin axes so that the wheel lever can rotate without subjecting the shock absorber rod 32 to excessive fore and aft stresses.

Rotation of the wheel lever beam 14 about the articulation point is controlled by varying the effective length of the shock absorber 32, variation of the length of the shock absorber being effected by operation of the jack-screw 34 to raise or lower the shock absorber relative to the inner cylinder 24 and hence, relative to the fuselage 30. The wheels 16 and 18 are rotatably mounted on spindles 64 on the ends of a bogie beam 66 formed or otherwise provided on the wheel lever beam 14. Conventional brake reaction links 68 are connected between brake lever arms 70 and flanges 72 on the inner housing plate 44.

As indicated previously, the kneeler 20 is U-shaped and includes a horizontal cross-bar 20A and two spaced apart arms 20B extending upwardly from the ends thereof. The cross-bar defines a flat, ground-engaging surface 74 on its underside. This surface 74 may be defined by a resilient pad on the underside of the kneeler, the purpose of the pad being to minimize damage to surfaces on which the gear is kneeled. The kneeler 20 is mounted for rotation about the articulation point independently of rotation of the wheel lever beam 14. Rotation of the kneeler is effected by a suitable hydraulic or electric actuator 76 bearing between a flange 43 on the inner housing plate 44 and an arm 50 on the kneeler.

FIG. 3 illustrates the fully extended or "static" mode of the gear normally assumed during takeoff, landing and taxiing. The jack-screw 34 has been extended so as to increase its effective length to the maximum. Shoulders 78 and 79 on the upper and lower ends of the shock absorber cylinder 80 are seated against annular surfaces 82 and 83 on the interior of the inner housing 24. The landing gear 10 is thus mechanically extended to its fully extended position with the only allowable vertical travel of the wheel lever beam 14 in rotation about the articulation point being governed by the characteristics of the shock absorber 32 which buffers load forces transmitted through the jack-screw 34. When the aircraft becomes airborne on takeoff, the wheels assume a no-load position shown by dot-dashed line 84 in FIG. 3. During takeoff, landing and taxiing operations, the kneeler 20 can and should be rotated upwardly (as shown in FIG. 3) in order to avoid contact between the kneeler and the ground in the case of a tire blowout or extreme impact upon landing.

The kneeling mode of the landing gear is best shown in FIGS. 1 and 2. Transition of the gear from the extended mode to the kneeling mode is initiated by energizing the kneeler actuator 76 to pivot the kneeler 20 downwardly so that its ground-engaging surface 74 is disposed horizontally. With the kneeler thus positioned, the jack-screw drive motor 42 is energized so as to rotate the drive nut 36 via the worm gear 40, thereby retracting the shaft 86 of the jack-screw 34 and the shock absorber 32 upwardly into the inner housing 24. This causes the wheel lever beam 14 to rotate upwardly about the articulation point and thus lower the fuselage 30 and the kneeler 20 until the kneeler engages the ground 88 and assumes a portion of the load borne by the landing gear. It will be appreciated that the kneeling mode of the landing gear is essentially a partially retracted mode carried out on the ground subsequent to extension of a kneeler.

Because of the rigid connection between the kneeler 20 and the aircraft proper, lowering of the fuselage ceases once the kneeler engages the ground. Continued operation of the jack-screw mechanism 34 will decrease the effective length of the shock absorber mechanism 32, raise the wheel lever 14 and the wheels 16 and 18 relative to the kneeler 20 and thus transfer to the kneeler more of the load borne by the landing gear. The wheel lever 14 and wheels could be retracted to their fully retracted position, but it will normally be desirable to distribute the load between the wheels and kneeler so that a more stable support for the aircraft will be provided and damage to the surface on which the aircraft is parked will not be caused by placement of undue weight on the kneeler.

It will be noted that since the kneeler 20 bears against the surface on which the aircraft is parked, the aircraft is stabilized laterally and vertically, eliminating or at least minimizing motion of the cargo deck during movement of heavy cargo items and/or loading equipment along or to and from the cargo deck.

To return the landing gear to its static mode, the actuating sequence just described is reversed. Initially, the jack-screw drive motor 42 is energized in a reverse direction causing the jack-screw shaft 86 to extend and the aircraft fuselage to be raised relative to the wheels. Once the fuselage has been elevated to an extent that the undersurface of the kneeler is elevated above the ground the kneeler actuator is energized to pivot the kneeler to its partially retracted position shown in FIG. 3. After the aircraft is airborne, the gear is fully retracted so as to position the wheels in the wheel well as shown by the dot-dashed line 90 in FIG. 2. So as to minimize wheel well space needed to accommodate the landing gear, the kneeler 20 can be rotated to its fully retracted position in which it abuts or nearly abuts against the wheel lever 14. The rear edge 92 of the kneeler cross-bar 20A is slanted so as to allow maximum retraction of the kneeler.

Retraction of the shock absorber 32 is limited by engagement of the shoulders 78 and 79 on the upper and lower ends of the shock absorber cylinder 80 with the restraining surfaces 96 and 98 on the interior of the inner housing 24. Upon such engagement, a limit switch (not shown) deenergizes the jack-screw worm drive motor 42 and initiates closure of the wheel well doors (also not shown).

An important feature of the kneeling landing gear shown in the drawings is that it is steerable to facilitate maneuvering of the aircraft during takeoff, landing and taxiing. Steering of the landing gear is effected by remotely controlled push-pull type steering actuators 100 and 102. The drive rods 104 and 106, respectively, of each of these actuators is disposed between and rotatably connected (by means of pins) to one of two pairs of flanges 108 and 110 extending forwardly from the outer strut housing 22. The cylinder of each actuator is disposed between and connected to the inner housing plate 44 and an outer housing plate 112 which is mounted for free rotation in a groove 114 extending around the exterior of the lower end of the outer housing.

Figure 7:
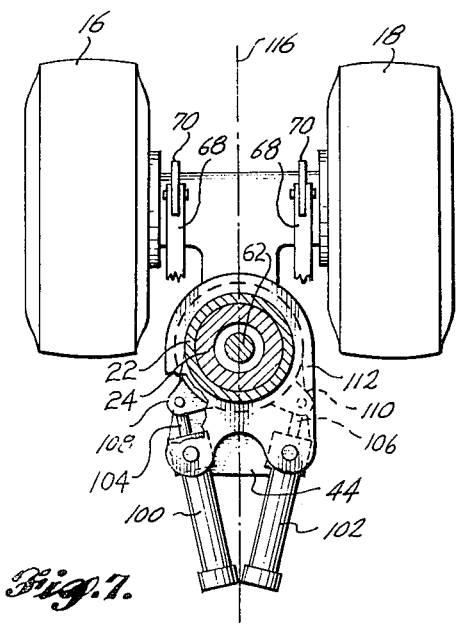
FIG. 7 is a sectional view along line 7—7 of FIG. 3.
Figure 8:
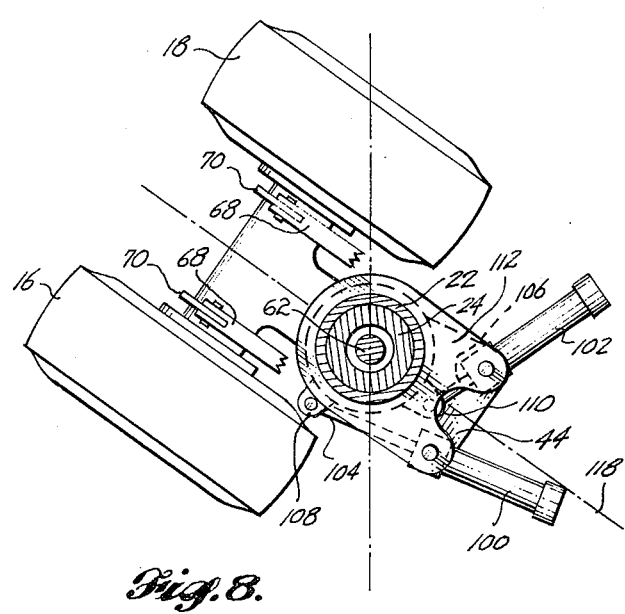
FIG. 8 is similar to FIG. 7, but shows the gear steered at an angle to that shown in FIG. 7.

Referring to FIG. 7, it will be seen that the wheels 16 and 18 are aligned with the longitudinal axis 116 of the aircraft, the steering actuators 100 and 102 being in their "neutral" positions. In FIG. 8, the directional axis 118 of the wheels has been displaced to steer the aircraft to the left. This has been accomplished by energizing the starboard actuator 100. The other actuator 102 remains deenergized as the truck is steered to the right. It will be noted in FIGS. 7 and 8 that the brake reaction links 68, though cut away as an illustrative expedient, are fully operable and capable of receiving brake reaction loads from the brake lever arms 70 through the full steering travel of the gear. Operation of the kneeler 20 is also unaffected by displacement of the directional axis 118 of the wheels from the longitudinal axis 116 of the aircraft.

Figure 9:
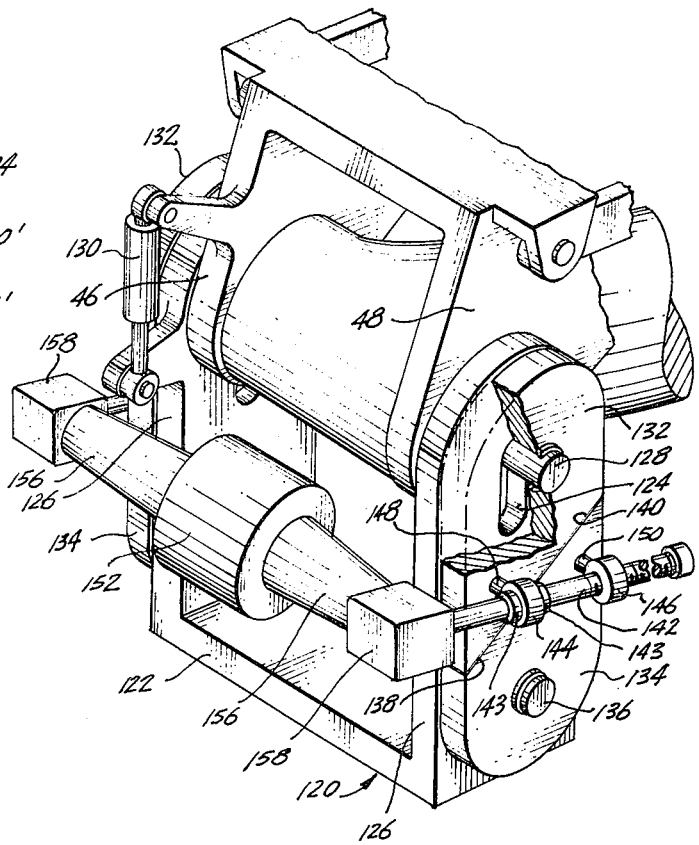
FIG. 9 is an isometric view of another embodiment of this invention which includes a mechanism permitting fine adjustment of the effective length of the landing gear when in its kneeling position.
Figure 10:
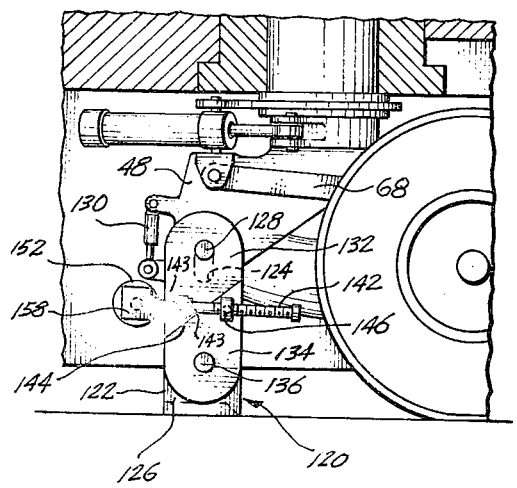
FIGS. 10 and 11 are side elevation views of the embodiment of FIG. 9 in two different positions of adjustment.
Figure 11:
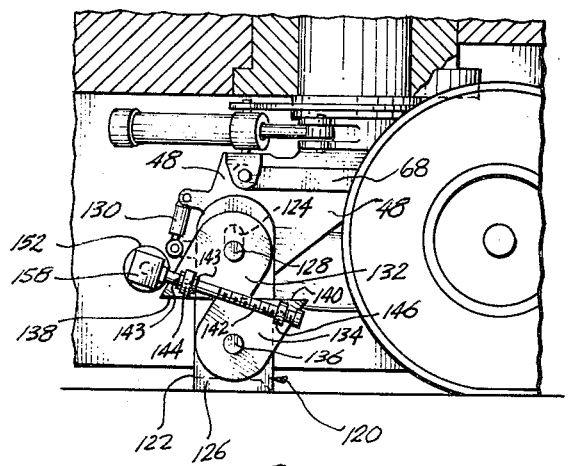

Referring now to FIGS. 9–11, there is shown an embodiment of the landing gear of this invention incorporating an adjustable kneeler 120, the effective height of which can be adjusted when it is in its kneeled position bearing part of the weight of the aircraft so as to permit fine adjustment of the height and level of the cargo deck. This adjustable kneeler includes a U-shaped member that is similar in configuration to that in the previously described embodiment and consists of a horizontal cross-bar 122 and arms 126. The U-shaped member includes a vertically elongated slot 124 in the upper portion of each of its arms 126. The pivot shaft 128 defining the articulation point of the landing gear extends through and beyond this slot. The U-shaped member is rotatable around the articulation point by an actuator 130 functioning in the same fashion as that in the previously described embodiment. On each end of the pivot shaft is mounted an upper cam 132 which abuts against the exterior of an arm 126 of the U-shaped member. Each of the upper cams is rotatable in a vertical plane through a limited range around the pivot shaft 128. Situated below each of the upper cams 132 is a lower cam 134 mounted on the lower portion of an arm 126 by a shaft 136 about which the lower cam is rotatable in a vertical plane. The upper and lower cams define two mating cam surfaces 138 and 140 disposed at approximately 45° angles to horizontal. Rotation of each pair of upper and lower cams is controlled by remotely controllable adjustment mechanism including a motor driven, threaded drive shaft 142 having two nuts 144 and 146 thereon. One of the nuts 144 is connected by means of a pin 148 to the upper cam 132 near the lowermost end of its cam surface 138 while the other nut 146 is connected by means of a pin 150 to the lower cam 134 near the upper end of its cam surface 140. Each of the nuts 144 and 146 is freely rotatable on the pin that connects it to one of the cams 132 and 134.

The upper cam nut 144 is situated on an unthreaded segment of the drive shaft 142 but is restrained from axial movement along the shaft by rings 143 welded to the shaft on both sides of the upper cam nut. The shaft 142 is freely rotatable within the upper cam nut 144.

The lower cam nut 146 is threadedly engaged with the threaded portion of the drive shaft 142 and rotation of the drive shaft causes the lower cam nut to travel therealong. Rotational power is supplied to the drive shaft from a motor 152, output shaft 156 and right angle gear assemblies 158, all of which are schematically depicted in the drawings. Each drive shaft 142 is so threaded that when rotated in one direction, the lower cam nut 144 is driven away from the upper cam nut 146. This in turn causes rotation of the upper cam 132 in one direction and the lower cam 134 in the other and a sliding action between the cam surfaces 138 and 140 of the two cams. Rotation of the cams causes the pivot shaft 128 to move upwardly or downwardly in the elongated slot 124 thus increasing or reducing the effective height of the kneeler.

In FIGS. 9 and 10, the kneeler 120 is shown adjusted to its maximum height, whereas in FIG. 11, the kneeler is shown adjusted to minimum height. A three-inch adjustment capability in the adjustable kneeler is considered to be ample to compensate for most ground elevation differences occurring between the several landing gears on an aircraft. The adjustable kneeler on each landing gear unit of the aircraft should be individually adjustable to any point within its operational span. This is in contrast to main height control mechanisms which would ordinarily be operated in unison.

Figure 6:
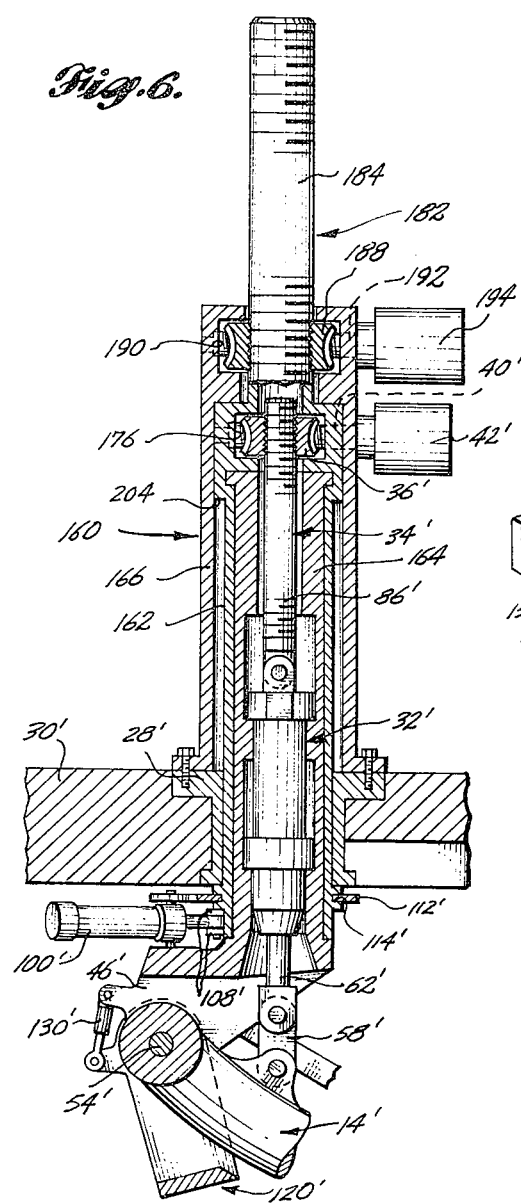
FIG. 6 is a vertical sectional view of another embodiment of the landing gear of this invention.

Another embodiment of the landing gear assembly of this invention is shown in FIG. 6. The effective length of this embodiment can be adjusted over a greater range than the previously described embodiment, and it is therefore particularly useful near the nose of an aircraft where its greater height adjustability can be used to advantage to elevate the nose of the aircraft so that the aircraft can assume an optimum attitude for takeoff. Many of the elements in this embodiment are identical or very similar in structure, function and operation to those elements of the previously described embodiment that are identified by the same but unprimed numerals.

In contrast to the previously described embodiment, the shock strut 160 embodiment of FIG. 6 includes in intermediate tubular housing 162 concentric with and disposed between the inner and outer housings 164 and 166, respectively. The outer housing 166 is bolted to a mounting sleeve 28' in the aircraft fuselage 30' and is thus fixed against rotation and translation relative thereto. The intermediate and inner housings are moveable up and down relative to the outer housing but are not moveable axially relative to each other. The intermediate housing 162 cannot rotate within the outer housing 166, but the inner housing 164 is rotatable relative to the intermediate and outer housings. The nut 36' of the jack-screw 34' that is connected to the shock absorber 32' (hereafter referred to as the primary jack-screw) is contained in a cavity 176 in the upper end of the intermediate housing, and is rotatable within that cavity but is otherwise restrained from movement. The nut of the primary jack-screw is driven by a single start worm gear 40' which is in turn driven by a suitable drive motor 42'.

Movement of the intermediate housing 162 (and the inner housing 164) up and down within the outer housing 166 is effected by a secondary jack-screw 182, the screw 184 of which is connected to or formed as an extension of the upper end of the intermediate housing 162. The screw 184 of the secondary jack-screw 182 is hollow so that the screw 86' of the primary jack-screw 34' can be extended thereinto upon retraction of the shock absorber 32'. The nut 188 of the secondary jack-screw 182 is contained in a cavity 190 in the upper end of the outer housing 166 and is rotatable within the cavity but otherwise restrained from movement. The nut of the secondary jack-screw is driven by a single start worm gear 192 which is in turn driven by a suitable motor 194.

Although not shown in FIG. 6, the outer housing 166 is open on the side away from the view. The worm gear 40' and drive motor 42' of the primary jack-screw assembly 34' are mounted on and carried by the intermediate housing 162 as it travels up and down within the outer housing.

It will be noted that an intermediate housing plate 112' identical to the outer housing plate of the embodiment of FIGS. 1-3 is mounted for free rotation in a groove 114' extending around the exterior of the lower end of the intermediate housing 162. It will also be noted that there are two pairs of forwardly extending flanges 108' (only one pair of which is shown) on the lower end of the intermediate housing. Steering actuators are connected to these flanges and to the intermediate housing plate in the same manner as the steering actuators in the embodiment of FIGS. 1-3 are connected to flanges 108 and 110 and outer housing plate 122.

In FIG. 6, the intermediate housing 162 is shown fully retracted into the outer housing 166. In its fully extended position a shoulder 204 on the exterior of the intermediate housing abuts against the mounting sleeve 28' and prevents further extension.

While the preferred embodiments of this invention have been illustrated and described, various innovations, modifications and equivalents will be apparent to those skilled in the art. The appended claims are intended to cover all innovations, modifications and equivalents that fall within the true spirit and scope of this invention.

What is claimed is:

1. An articulated, variable-height aircraft landing gear assembly selectively providing either impact-absorbing support to an aircraft while stationary or moving along the ground or rigid, unsprung support for the aircraft when stationary, comprising:

a shock strut comprising a rigid, tubular housing and a shock absorbing means mounted in the housing for absorbing shock applied to the assembly; a wheel lever having first and second ends; means pivotably connecting the lever to the strut housing near the first end such that the lever is pivotable in a vertical plane about its first end between an extended position and a retracted position; a wheel mounted on the lever near its second end; means operatively connecting the shock absorbing means to the lever between its first and second ends; power means for selectively varying the effective length of the shock absorbing means to thereby move the lever between its extended and retracted positions and thereby vary the effective height of the landing gear assembly; rigid, aircraft support means for supporting at least a portion of the load borne by the landing gear assembly, the support means being mounted on the housing near the first end of the lever and defining a flat, ground engaging surface on the underside thereof, the support means extending downwardly from the housing a distance such that when the wheel is in contact with the ground and the lever is moved from its extended position toward its retracted position, the flat surface of the support means contacts the ground and at least a portion of the load borne by the landing gear assembly is transferred from the wheel to the support member, the support means and the housing together defining a rigid, unsprung load path through the strut.

2. A landing gear assembly according to claim 1 wherein the support means is pivotable in a vertical plane about an axis coincident with the pivot axis of the lever.

3. A landing gear assembly according to claim 2 further comprising actuator means for effecting pivoting of the support means.

4. A landing gear assembly according to claim 2 wherein the support means comprises a U-shaped member including a horizontal cross-bar defining the ground engaging surface and two spaced aparts arms extending upwardly from said cross-bar, the pivot axis of support means extending through the upper ends of the arms.

5. A landing gear assembly according to claim 1 wherein the strut housing comprises tubular, coaxial, inner and outer housings, the inner housing being contained in and supported by the outer housing and being axially rotatable relative thereto; the shock absorbing means being contained in the inner housing and being moveable axially therealong; and the support means depending from the inner housing.

6. A landing gear assembly according to claim 5 wherein the means for varying the effective length of the shock absorbing means comprises means for selectively moving same along the inner housing.

7. A landing gear assembly according to claim 6 wherein the means for moving the shock absorbing means comprises a jackscrew secured to the shock absorbing means.

8. A landing gear assembly according to claim 5 further comprising actuator means for effecting rotation of the inner housing relative to the outer housing.

9. The landing gear assembly according to claim 5 wherein the inner housing is moveable axially along the outer housing and the assembly further comprises power means for effecting such movement of the inner housing.

10. A landing gear assembly according to claim 1 wherein the effective height of the support means is selectively variable.

11. The landing gear assembly according to claim 10 wherein the support means comprises a U-shaped member including a horizontal cross-bar defining the ground engaging surface and two spaced apart arms extending upwardly from the cross-bar, an upper cam member and a lower cam member immediately subjacent the upper cam member, each of the cam members having a flat cam surface abutting against the cam surface of the other; a first connection means connecting the upper cam member to the strut housing and permitting rotation of the upper cam member in a vertical plane about a first rotation axis; second connection means connecting the lower cam member to one of the arms and permitting rotation of the lower cam member in a vertical plane about a second rotation axis; and power means connected to the cam members for effecting counterrotation of the cam members about their respective rotation axes to thereby cause the cam surfaces to slide along one another, the cam surfaces being so oriented relative to a line between the rotation axes of the cam members that pivoting of the cam members causes the distance between the rotation axes and the effective length of the support member to vary.

12. The landing gear assembly according to claim 11 wherein the arm to which the lower cam member is connected defines near its upper end a vertically elongated slot and wherein the first connection means comprises a horizontally disposed pin extending through the slot and the upper cam member.

* * * * *